April 25, 1961

H. F. ERDLEY 2,981,113

PRECISION DIRECTIONAL REFERENCE

Filed Nov. 19, 1958

INVENTOR
Harold F. Erdley

By Richard K. Ehrlich
Attorneys

April 25, 1961 H. F. ERDLEY 2,981,113
PRECISION DIRECTIONAL REFERENCE
Filed Nov. 19, 1958 2 Sheets-Sheet 2

INVENTOR:
Harold F. Erdley
By Richard F. Ehrlich
Attorney

United States Patent Office 2,981,113
Patented Apr. 25, 1961

2,981,113

PRECISION DIRECTIONAL REFERENCE

Harold F. Erdley, Los Angeles, Calif., assignor, by mesne assignments, to Litton Systems, Inc., Beverly Hills, Calif., a corporation of Maryland Filed Nov. 19, 1958, Ser. No. 774,985

13 Claims. (Cl. 74—5.4)

The present invention relates to a precision directional reference including a rotatable gyro and more particularly to a precision directional reference including a rotatable gyro whose A.C. output signal is partially inverted and summed whereby error components of the output signal are substantially eliminated by cancellation.

In the past few years considerable interest has been generated in automatic navigational systems for moving vehicles such as aircraft. One of the most promising types of automatic navigational systems is the inertial type. This type of guidance and navigation system is particularly promising since the system has the inherent advantages that it requires little or no ground equipment and does not require that radiation of any type be emitted from the moving vehicle.

Fundamentally, an inertial system is able to determine the displacement of a moving vehicle carrying the system from its starting point by measuring the accelerations of the carrying vehicle relative to the earth. When it is remembered that velocity is the rate of change of distance with respect to time and acceleration is the rate of change of velocity with respect to time, it is clear that from a measurement of the accelerations of the vehicle the velocity of the vehicle as well as the distance traveled by the vehicle can be calculated.

One of the basic components of an inertial guidance system that must be carried by the vehicle is a gyro-stabilized platform upon which accelerometers can be mounted. This gyro-stabilized platform must be maintained in a horizontal position and furthermore, the platform must always keep the accelerometers properly oriented in azimuth relative to the respective north-south and east-west axes. The accuracy of the inertial guidance system is dependent to a very great degree upon the proper stabilization of the platform in both the horizontal position and in azimuthal position. It should be noted in this regard that the successful utilization of an inertial guidance system is dependent for practical purposes upon the proper azimuth orientation of the platform immediately before the start of flight of the moving vehicle since the platform can be aligned with much greater accuracy before flight than during it and since any error in the original orientation of the platform will cause a continuous error in the direction of acceleration to be sensed throughout the flight of the moving vehicle. As heretofore mentioned the distance traveled by the vehicle is calculated by taking the double integral of the acceleration so that the continuous error in acceleration will build up in proportion to the second power of time. Hence, unless the azimuth orientation of the platform is determined with great accuracy an intolerable error in the distance traveled will be generated.

As heretofore suggested, platform alignment divides itself into two separate problems. The first is to orientate the platform properly about the two level axes or in other wards to orientate the platform horizontally, which is almost always accomplished by means of a gravitational reference. The other problem, and in general, the more difficult one, is to align the platform about the vertical axis to the desired orientation. This azimuth alignment can be conventionally accomplished by either of two general methods. The first method is to use an optical link from some external system such as an astronomical sighting or a sighting with some other object whose azimuth is accurately known. This method has two serious disadvantages, one disadvantage being that at some point of time which is necessarily a period of time before the moving vehicle commences its flight, the optical link must be broken in order to make the moving vehicle ready for flight, thereby any error introduced into the azimuth orientation of the platform after this time and while the vehicle is made ready for flight will go uncorrected. The other disadvantage of this system is that in some cases it is impossible to obtain an optical link to some object of known azimuth position. This would be true, for example, if the moving vehicle was to commence its flight underwater.

The second method utilizes the platform stabilizing gyros and the platform accelerometers in a self-alignment mechanization in order to align the platform to the proper azimuth orientation. This method of platform alignment is satisfactory in inertial systems where high orders of accuracy are not absolutely essential. However, in prior art self-alignment mechanization systems inherent errors in the platform gyros and accelerometers introduce erors in platform alignment that are intolerable in applications where a high degree of accuracy is required such as in long range, relatively fast moving vehicles.

One example of a prior art self-alignment mechanization system involves the use of accelerometers mounted on the platform and which are used as a vertical reference. More particularly, the outputs of the accelerometers are used in a feedback system to torque the platform leveling gyros in such a way that the platform angular deviations about the leveling axes are kept to a null. Hence, by measuring the electrical feedback signals to the gyro torquers of the leveling gyros it is possible to obtain signals which can be used to calculate the azimuth orientation of the platform. In this system, however, the accuracy of the system is a strong function of the accuracy with which the stabilized platform is horizontally stabilized. The slightest variation from the horizontal position will introduce a sizable error into the determination of the azimuth alignment. Unfortunately, even the best known methods of gyro platform stabilizing allow the stabilized platform to vary from the horizontally stabilized position because of the effects of gyro error torques, gyro torquer factors, time derivative of accelerometer error torques, and the errors which result from the imperfection in a ship's motion compensation system if the vehicle is to be fired from a submarine or other type of ship.

Therefore, it is clear that there is a great need in the prior art for a stabilized platform self-alignment system capable of determining the azimuth orientation of a stabilized platform and whose accuracy of operation is not a strong function of the inherent errors in the platform leveling system.

The present invention overcomes the above and other disadvantages of the platform self-alignment systems of the prior art by providing according to one of the basic concepts of the invention, a gyro coupled to a stabilized platform which produces an output signal having an alternating current component which is substantially representative of the azimuth orientation of the stabilized platform and a direct current component which is substantially representative of the inherent errors in the leveling gyros of the stabilized platform. In accordance with the invention, the output signal is partially inverted or rectified and summed whereby the direct current error component is substantially eliminated by cancellation so that the stabilized platform can be accurately aligned despite the inherent errors in the platform stabilizing system.

In accordance with another concept of the invention, the gyro case of the gyro mounted on a stabilized platform is rotated about the spin axis of the gyro with a frequency having a predetermined period so that the gyro output signal is substantially an A.C. signal with a frequency having the predetermined period. Furthermore, the gyro case rotates about the north-south axis with the stabilized platform in order to compensate for earth rotation, the position of the gyro case with respect to the north-south axis being reflected in the phase of the gyro output signal. Hence, azimuth orientation of the platform is then accurately obtained by examining the phase shift of each cycle of the gyro output signal at a time when the gyro case has a predetermined angular position with respect to the platform.

More specifically, in accordance with another concept of the invention the phase of the gyro output signal is compared with the phase of a square wave signal which is synchronously generated with the rotation of the gyro case and the phasing difference between the two signals is representative of the azimuth orientation of the platform. In more detail, a timing signal is generated whenever the gyro case has the predetermined angular position and the gyro output signal is multiplied by the square wave signal for a period commencing upon generating of the timing signal and continuing for the predetermined period. The synchronously rectified product is then summed and used for torquing the platform.

According to another of the concepts of the invention, error components of the gyro output signal are substantially D.C. in form so that by rotating the gyro case the azimuth position of the platform is represented by the A.C. component of the gyro signal. Hence, by the process of synchronous rectification and summation the D.C. error component of the gyro output signal is eliminated by cancellation and the A.C. input is rectified to alternating D.C. and summed. In this manner, errors in the gyro output signal due to gyro imbalance, gyro bearing errors that are constant in nature, and frictional torques due to pick-off and torquer connections to the rotor-and-motor assembly are eliminated. Furthermore, if the gyro is a floated type of gyro convection current torque errors are eliminated.

In addition, all other errors which are not fourth harmonics of the gyro case rotation or a multiple thereof are substantially eliminated. Hence, all errors which are constant in nature and which are not fourth harmonics or multiples thereof of the gyro case rotations are eliminated.

In one embodiment of the invention, a two degree of freedom gyro generating an output signal is rotatably mounted on a stabilized platform with its spin axis oriented substantially vertically. When the rotating gyro case has a predetermined angular position with respect to the stabilized platform and a position 180° therefrom, a pair of first and second precision switches are closed whereby a pair of first and second timing signals are generated, respectively. A synchronous rectification circuit is coupled to the rotating gyro case and has the output signal applied thereto for periodically reversing the polarity of the output signal in response to said timing signals.

This embodiment of the invention further includes two integrators which are alternately operable for being charged with the rectified output signal, one of the integrators being charged with the rectified output signal for summing the signal when the output of the other previously charged integrator is being applied to the stabilized platform for torquing the platform to a predetermined azimuth orientation. When the timing signal is next generated the roles of the integrators are changed so that the more recently generated cycle of the rectified output signal can be applied to the stable platform, therefore, further torquing the stabilized platform to the predetermined azimuth position. When the platform is oriented at the predetermined azimuth position the rectified and summed output signal has a zero value whereby the platform is stabilized at the predetermined azimuth orientation.

It should be specifically noted herein that while the embodiment of the invention described hereinabove utilizes a two-degree-of freedom gyroscope, the concepts of the invention can be applied to a directional reference using a single-degree-of freedom gyroscope also. Therefore, the scope of the invention is not to be limited to use with two-degree-of freedom gyroscopes but is to include the use of single-degree of freedom gyroscopes.

It is, therefore, an object of the present invention to provide a precision directional reference.

It is another object of the invention to provide a precision directional reference which includes a gyro that is rotatable about its spin axis.

It is still another object of the invention to provide a precision directional reference wherein a substantially A.C. gyro output signal is synchronously partially rectified whereby errors in the A.C. gyro output signal are substantially eliminated.

It is a further object of the invention to provide a precision directional reference for determining the azimuth orientation of a stabilized platform.

It is still another object of the invention to provide a precision directional reference system for determining the azimuth orientation of a stabilized platform and whose accuracy is not a strong function of the inherent error in the platform instrumentation.

The novel features which are believed to be characteristic of the invention, both as to its organization and method of operation, together with further objects and advantages thereof, will be better understood from the following description considered in connection with the accompanying drawings in which an embodiment of the invention is illustrated by way of example. It is to be expressly understood, however, that the drawings are for the purpose of illustration and description only, and are not intended as a definition of the limits of the invention.

Figure 1:
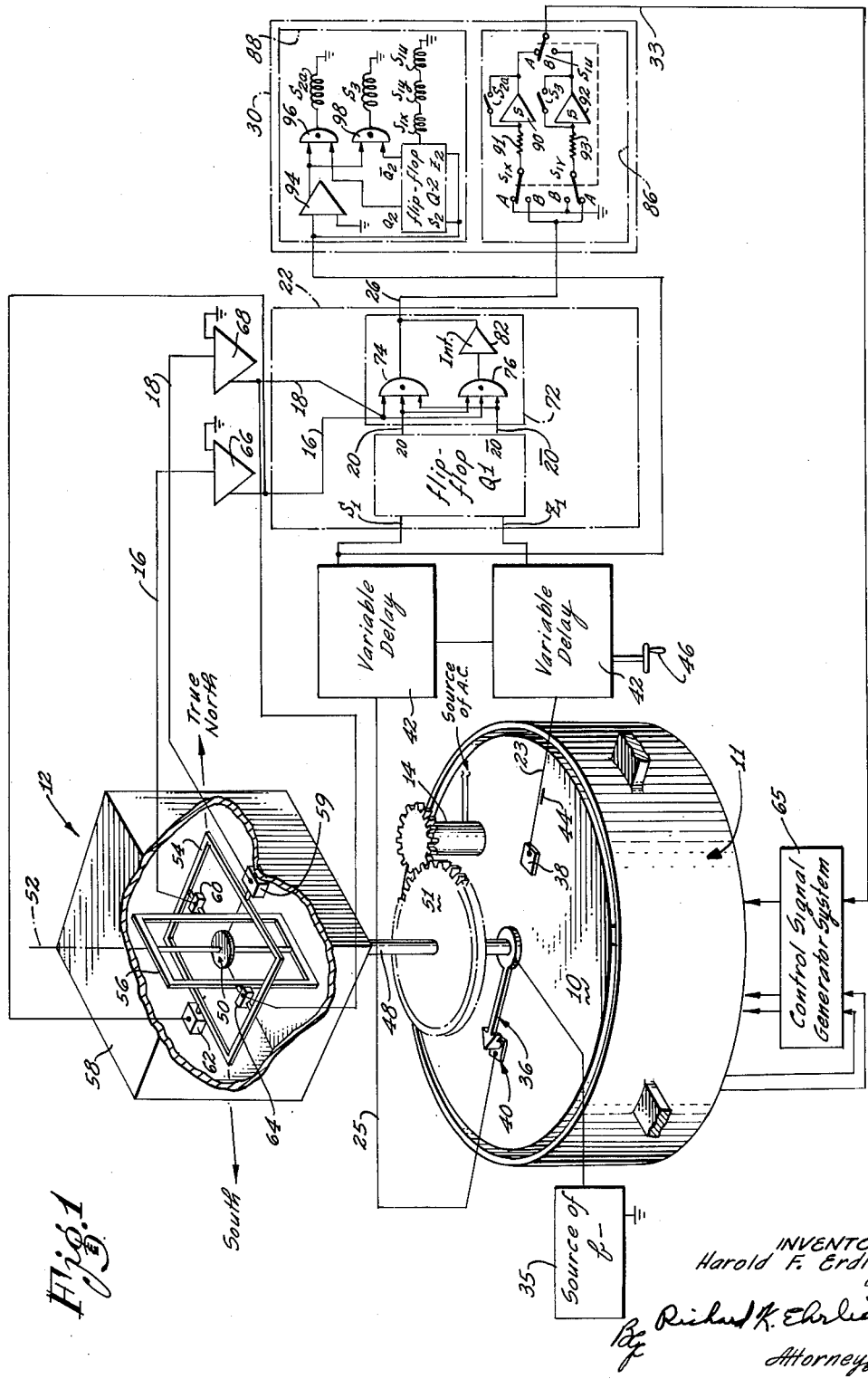
Fig. 1 is a partly block, partly circuit diagram of one embodiment of the invention.

Referring now to the drawings, wherein like or corresponding parts are referrred to with the same reference character throughout the several views, there is shown in Fig. 1, one embodiment of a precision directional reference system of the invention wherein a stabilized platform is accurately aligned to a predetermined azimuth orientation. More specifically, a two-degree of freedom gyro 12 which is rotatively mounted on a stabilized platform 10 generates output signals which are synchronously rectified, in accordance with one of the basic concepts of the invention, and then applied to stabilized platform 10 for torquing the platform to the predetermined azimuth orientation.

As shown in Fig. 1, two-degree of freedom gyro 12 is rotatably coupled to stabilized platform 10 in such a manner that the spin axis of the gyro is vertically oriented. As indicated in Fig. 1, gyro 12 is rotated by a synchronous motor 14 whereby gyro 12 generates a pair of substantially alternating current output signals 16 and 18 whose phase shift with respect to a square wave signal 20, to be hereinafter more thoroughly discussed, is representative of the azimuth orientation of platform 10. As shown in Fig. 1, the output signals 16 and 18 are applied over correspondingly designated conductors to a synchronous rectification circuit 22 which is coupled to the rotating gyro 12 by means of a pair of conductors 23 and 25 carrying correspondingly designated timing signals 23 and 25, to be hereinafter discussed. For purposes of facilitating and clarifying description, each conductor will be hereinafter similarly designated in terms of the signal applied over the conductor. Rectification circuit 22 is operable for generating a square wave signal 20 whose high and low levels are assigned +1 and −1 values, respectively, synchronously generated with the rotation of gyro 12. Rectification circuit 22 is further operable for operating on the square wave signal and the output signals for generating a rectified signal 26, signal 26 being representative of the product of the sum of output signals 16 and 18 and square wave signal 20. The operation of synchronous rectification circuit 22 can be described in another and possibly simpler manner which is that switch 22 is operable for generating signal 26 whose waveform is identical to the sum of output signals 16 and 18 during one-half of each cycle of output signals 16 and 18 and identical to the waveform of the sum of output signals 16 and 18 but with the opposite polarity during the other half of each cycle of output signals 16 and 18. Hence it is apparent that synchronous rectification circuit 22 generates signal 26 which is in essence equivalent to the partially rectified sum of signals 16 and 18.

As shown in Fig. 1, signal 26 is applied to a summation circuit 30 which is operable for summing the total value of one cycle of signal 26 in response to the application of timing signal 25 for generating a torquing signal 33 whose magnitude represents the total value over one cycle of signal 26, the torquing signal being applied to a control signal generating system 65 which is responsive thereto for affecting the values of the three actuating signals which are applied to stabilized platform 10 to actuate servo drives therein for changing the azimuth orientation of platform 10. Stabilized platform 10 is thereby driven to align itself to the predetermined azimuth orientation.

As indicated in Fig. 1, a precision switch has a rotor element 36 coupled to the rotating case of gyro 12 and to a source of negative potential 35, the rotor element being rotatable with gyro 12. The switch further includes a pair of stator contacts 38 and 40 positioned on platform 10 for generating timing signals 23 and 25, respectively. Contacts 38 and 40 are positioned 180 degrees from each other on the platform so that timing signals 23 and 25 are generated once each period of revolution of gyro 12 and at an interval from each other of one-half the period of revolution.

As shown in Fig. 1, timing signals 23 and 25 are applied to a pair of ganged variable delay circuits 42 having a crank 46 and which are operable for equally delaying the passage of timing signals 23 and 25 to synchronous rectification circuit 22 and to summation circuit 30 whereby platform 10 can be aligned to any selected azimuthal angle, the length of the delay being determined by rotation of crank 46. For example, as will be hereinafter more fully explained, if timing signals 23 and 25 are not delayed, a lubber's point 44 on platform 10 will be aligned with true north while if timing pulses 23 and 25 are delayed an interval equal to one-half the period of rotation of gyro 12, lubber's point 44 will be aligned with an azimuthal position 180 degrees from true north. Hence, by rotation of a crank 46, platform 10 can be precisely aligned to any desired azimuthal orientation.

Figure 4:
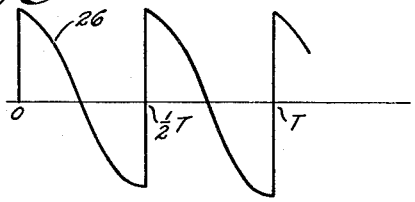
Figure 7:
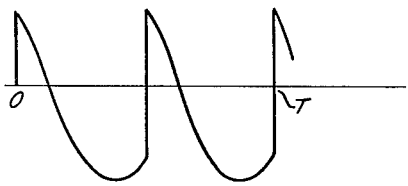

Referring now in detail to stabilized platform 10, which is housed in a housing 11, as has been hereinbefore mentioned, the function of stabilized platform 10 is to maintain itself in a fixed position with respect to the earth's gravitational field; namely, to stabilize itself in a horizontal plane with respect to the earth. Various methods of mechanizing a stabilized platform are known in the art. One system suitable for use as stabilized platform 10 is described in detail in United States Patent No. 2,752,792, issued on July 3, 1956, to C. S. Draper, et al., entitled, "Gyroscopic Apparatus." As shown in Figure 4 of the Draper patent, the platform is stabilized by the use of three single-degree-of-freedom gyros and in Fig. 7, Draper indicates the nature of the intercoupling between control signal generator system 65 and stabilized platform 10, stabilized platform 10 being considered to include gimbal servo amplifiers 75, the gimbaling and gimbal drives, and the trigonometric resolution system shown in Fig. 7 of Draper. It should be noted that to utilize the platform and control signal generating system 65 of Draper in the present invention torquing signal 33 should be applied to direct channel 68a and integration channel 68b within the control signal generating system 65 rather than the signal from the magnetic compass system 200 as is indicated in Fig. 7 of Draper.

Directing attention again to platform 10 of Fig. 1, a shaft 48 is rotatably coupled to the stabilized platform, the shaft further having a gear 51 concentrically positioned thereon. A synchronous motor 14 is affixed to stabilized platform 10 in such a position that it contacts gear 51 for rotating shaft 48 which in turn rotates gyro 12.

Examining now gyro 12 in detail, the gyro includes a rotor and motor assembly 50 which is rotatable about a spin axis 52 at a relatively fast rate, the gyro further including an outer gimbal 54 rotatable about an outer gimbal axis and an inner gimbal 56 rotatable about an inner gimbal axis, the two gimbal axes being mutually orthogonal with each other and with spin axis 52. Gyro 12 further includes a case 58 which is affixed to shaft 48 and a pick-off 59 and a pick-off 60. As shown in Fig. 1, pick-off 59 is connected to gyro case 58 and to outer gimbal 54 while pick-off 60 is affixed to inner gimbal 56 and outer gimbal 54. In operation, pick-off 59 is responsive to relative rotation of the gyro case about the outer gimbal axis for generating output signal 18 whose magnitude is proportional to the deflection about the outer gimbal axis. On the other hand, pick-off 60 is operable for generating output signal 16 whose magnitude is proportional to the deflection of gyro case 58 about the inner gimbal axis. Apparatus for mechanizing pick-offs 59 and 60 are well known to one skilled in the art, for example, suitable structure for the mechanization of pick-offs 59 and 60 are disclosed in "Control-Systems Dynamics" by Walter Evans published by McGraw-Hill in 1954 at page 17 and at page 20 a pick off element being shown at page 17 and a demodulator for use with the pick off element being disclosed at page 20.

As shown in Fig. 1, gyro 12 further includes a pair of torquers 62 and 64, torquer 62 being affixed to the gyro case and outer gimbal 54 and is operable for torquing outer gimbal 54 for causing rotor-and-motor assembly 50 to precess about the inner gimbal axis. As shown in Fig. 1, output signal 16 amplified by an amplifier 66 is applied to torquer 62 while output signal 18 amplified by an amplifier 68 is applied to torquer 64 so that rotor-and-motor assembly 50 is torqued so that it precesses in a manner such that it is maintained at a null position with respect to pick-off coils 59 and 60 and thereby case 58 of gyro 12. Since rotor-and-motor assembly 50 tends to retain its spin axis in the same position in space despite movements of gyro case 58, output signals 16 and 18 will be representative of the rate of rotation of case 58 about the outer and inner gimbal axes, respectively.

Referring now to the overall operation of gyro 12, if the stabilized platform remains at a fixed position on the earth's surface and horizontal therewith, the only rotational rates communicated to case 58 tending to cause movement about the gimbal axes are due to the rotation of the earth about an axis running through the earth's poles since platform 10 must rotate about a north-south axis as the earth rotates in order for platform 10 to maintain itself stabilized in a horizontal position with respect to the earth. Hence, case 58 will rotate about a north-south axis while rotor-and-motor assembly 50 tends to remain static in the absence of the application of output signals 16 and 18 to torquers 62 and 64, respectively.

Figure 2:
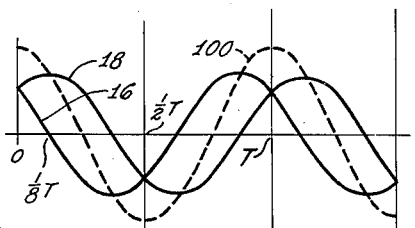
Figs. 2, 3 and 4 are graphs of signals generated by the embodiment of the invention shown in Fig. 1 when a stabilized platform is properly oriented.

Referring now to Fig. 2, there is shown a graph of the amplitudes of output signals 16 and 18 with respect to time $t$, gyro 12, at time $t$ equal to zero, being oriented with respect to true north in the manner depicted in Fig. 1 wherein pick-offs 59 and 60 are both symmetrically displaced 45 degrees from true north. Hence, the magnitude of signals 16 and 18 at this time are equal, as is shown in Fig. 2. When gyro 12 is rotated 45 degrees in the clockwise direction from the true north position shown in Fig. 1, pick-off 60 will be oriented in line with true north and will, therefore, generate signal 16 having a maximum value while pick-off 59 will be oriented 90 degrees from true north, and therefore, output signal 18 will be generated having a zero value at $t$ equal to $\frac{1}{8}T$, T being the period of rotation of gyro 12. As gyro 12 is rotated through the remaining 315 degrees of one cycle of rotation, it is clear that signals 16 and 18 are generated as shown in Fig. 2. In view of the foregoing, it is clear that the phasing of signals 16 and 18 with respect to a predetermined angular position of gyro 12 will be determined by the position of true north with respect to the gyro. Hence, the angular orientation of platform 10 can be determined therefrom.

It should be herein noted that the invention is not to be limited in any manner by the specific structure of the two-degree-of-freedom gyro described herein since any number of differing types of two-degree-of-freedom gyros may be utilized in the present invention to generate output signals 16 and 18. In fact, it is not essential to the operation of the invention to utilize two output signals. However, in accordance with the preferred form of the invention two output signals such as output signals 16 and 18 are utilized. Referring again to Fig. 1, it is shown therein that output signals 16 and 18 are applied to synchronous rectification circuit 22.

Referring now with particularity to synchronous rectification switch 22, the synchronous rectification circuit 22 is responsive to timing signals 23 and 25 for generating square wave signal 20 and a complementary square wave signal $\overline{20}$ and for operating on square wave signal 20 and output signals 16 and 18 to generate output signal 26 representing the product of the sum of output signals 16 and 18 and square wave 20 or, in other words, for partially rectifying the sum of output signals 16 and 18 since signal 20 has only $+1$ and $-1$ values. As shown in Fig. 1, synchronous rectifying circuit 22 includes a flip-flop circuit $Q_1$ which is responsive to timing signals 23 and 25 for generating square wave signal 20 and complementary signal $\overline{20}$. As shown in Fig. 1, flip-flop circuit $Q_1$ generates a square wave signal 20 having high and low voltage levels and a complementary signal $\overline{20}$. Flip-flop circuit $Q_1$ further has a pair of inputs designated as an $S_1$ and $Z_1$ input, the flip-flop being set to its "set" state by application of timing signal 25 to the $S_1$ input whereby signal 20 is produced having its high level and signal $\overline{20}$ is produced having its low level. Upon application of timing signal 23 to the $Z_1$ input the flip-flop is set to its "zero" state whereby signal 20 is produced having its low level and signal $\overline{20}$ is produced having its high level. The detailed structure for one suitable form of flip-flop can be found in the March 1955 issue of "IRE Transactions on Electronic Computers," in an article entitled "Transistor Circuitry for Digital Computers," by L. C. Wanlass at page 13.

Since timing signal 25 is generated only once each period of revolution of gyro 12 and at a predetermined angular position of gyro 12 and since timing signal 23 is generated when the gyro case has rotated 180° from the predetermined position flip-flop $Q_1$ synchronously generates square wave 20 and complementary square wave signal $\overline{20}$ having a period equal to the period of rotation of gyro 12. Square waves 20 and $\overline{20}$ as well as output signals 16 and 18 are applied to a multiplication circuit 72 which is responsive to the applied signals for generating output signal 26.

Multiplication circuit 72 includes relays 74 and 76 and an operational amplifier 82. As shown in Fig. 1, output signals 16 and 18, square wave signal 20, and complementary signal $\overline{20}$ are applied to relay 74 and relay 76. Relay 74 is operable for passing output signals 16 and 18 when square wave signal 20 has the high level and for not passing output signals 16 and 18 when square wave signal 20 has the low level. Relay 76 is operable for passing output signals 16 and 18 when square wave signal 20 is at the low level and for not passing output signals 16 and 18 when square wave signal 20 has the high level. Structurally relays 74 and 76 are similar to relay switches $S_{2a}$ and $S_3$ which are hereinafter described in detail.

As indicated in Fig. 1, the output terminal of relay 74 is connected to conductor 26 while the output terminal of relay 76 is connected to operational amplifier 82, the output of operational amplifier 82 being connected to conductor 26. Hence, when square wave signal 20 is at its high level output signals 16 and 18 are passed directly to conductor 26. However, when square wave signal 20 has its low level and complementary square wave signal $\overline{20}$ has its high level output signals 16 and 18 are passed to conductor 26 only by way of operational amplifier 82. Since operational amplifier 82 is operable to reverse the polarity of the signals applied thereto it is apparent that output signal 26 will be representative of the product of the multiplication of the sum of output signals 16 and 18 and square wave signal 20. A discussion of operational amplifiers and the detailed structure of one type of operational amplifier suitable for use as operational amplifier 82 can be found on pages 25 and 26 of a reference entitled, "Pulse and Digital Circuits" by Millman and Taub, published in 1956 by McGraw-Hill Book Co., Inc., of New York, New York. As hereinbefore mentioned, output signal 26 is applied to summation circuit 30 which is responsive thereto for generating a torquing signal 33 which is representative of the total value of one cycle of signal 26.

Referring now with particularity to summation circuit 30, summation circuit 30 includes an integrating circuit 86 and a switching circuit 88, integrating circuit 86 integrating one cycle of signal 26 under the control of switching circuit 88. More specifically, integrating circuit 86 includes a pair of integrators 90 and 92 which are used alternately for an interval equal to the period of output signal 26 to generate torquing signal 33. The integrating circuit is mechanized with two integrators which are used alternately since an integrator must integrate signal 26 over one complete cycle thereof before it is capable of generating torquing signal 33.

As shown in Figure 1, integrating circuit 86 includes the contact terminals of three synchronously operable double throw relay switches $S_{1X}$, $S_{1Y}$, and $S_{1U}$, each having a normally closed position A and a position B. In addition, integrating circuit 86 includes the contact terminals of a pair of momentarily closing relay switches $S_{2a}$ and $S_3$. As indicated in Figure 1, the coils for actuating the heretofore mentioned relay switches are contained within switching circuit 88. It should be noted that for ease of description and in order to simplify the drawings, the coil of each relay switch is designated in the figures by the same characters as the contact terminals of the switch. For example, the contact terminals of relay $S_{2a}$ are designated by the term "$S_{2a}$" as is the coil of the relay.

As further shown in Figure 1, signal 26 is applied to contact terminal B of relay switch $S_{1X}$ and to terminal A of relay switch $S_{1Y}$, terminal B of switch $S_{1Y}$ and terminal A of switch $S_{1X}$ being connected to a source of ground potential. As further shown in Figure 1, the swinger of relay switch $S_{1X}$ is connected to the input of integrator 90 through a resistor 91 while the swinger of $S_{1Y}$ is connected to the input of integrator 92 through a resistor 93. The output signal from integrator 90 is applied to contact terminal A of switch $S_{1U}$ while the output signal from integrator 92 is applied to contact terminal B of the switch. As will be hereinafter explained in connection with the operation of switching circuit 88, the plurality of relay switches $S_{1X}$, $S_{1Y}$, and $S_{1U}$ are all synchronously actuating so that the swingers of each switch contact the corresponding contact terminal A concurrently or the corresponding contact terminal B concurrently.

As shown in Figure 1, momentarily closing relay switch $S_{2a}$ electrically connects the input and output terminals of integrator 90 when switch $S_2$ is closed and relay switch $S_3$ intercouples the input and output terminals of integrator 92 when switch $S_3$ is closed. With the foregoing structure in mind, the operation of integrating circuit 86 can be easily described.

As shown in Figure 1, consider the situation where the swinger of each of the plurality of switches $S_{1X}$, $S_{1Y}$, and $S_{1U}$ is positioned to electrically contact its contact terminal A, it is clear the signal 26 will then be applied to integrator 92 and summed thereby while it is equally clear that the signal will not be applied to integrator 90. In addition, it should be noted that the output of integrator 90 is connected to conductor 33 so that the output of integrator 90 will represent torquing signal 33. If we assume that integrator 90 has previously integrated one complete cycle of signal 26 then it is clear that actuating signal 33 reperesents the total value of one complete cycle of output signal 26. Furthermore, if we assume that integrator 92 is now integrating one complete cycle of signal 26 it is equally clear that it is not desirable that the output of integrator 92 be applied to conductor 33 until sufficient time has elapsed for integrator 92 to sum one complete cycle of output signal 26.

As will be hereinafter disclosed in connection with the discussion of switching circuit 88, after integrator 92 has had sufficient time to integrate one complete cycle of signals 26, the plurality of switches $S_{1X}$, $S_{1Y}$, and $S_{1U}$ will be actuated to electrically disconnect contact terminals A and to electrically connect contact terminals B and at substantially the same time switch $S_{2a}$ will be momentarily closed thereby discharging integrator 90 so that it will be at ground potential, and thereby be ready to commence summing the next cycle of signal 26. In addition, integrator 92 will be connected to conductor 33 so that the output of integrator 92 will be applied to conductor 33 and will represent torquing signal 33. When integrator 90 has had sufficient time to integrate one full cycle of signal 26, the plurality of switches will again be actuated so that the output of integrator 90 will be connected to conductor 33 and output signals 26 will be applied to integrator 92, while at the same time, switch $S_3$ will be closed momentarily in order to discharge integrator 92 to bring it to ground potential. Hence, considering the operation of integrating circuit 86 over two cycles of signal 26, the first integrator integrates the first of the two cycles while the output of the second integraor is being applied to conductor 33. Commencing with the second cycle the roles of the integrators are interchanged and the output of the first integrator is applied to conductor 33 while the second integrator integrates the second cycle.

Examining now the operation of switching circuit 88, as has been heretofore explained switching circuit 88 is responsive to timing signal 25 to actuate the plurality of switches $S_{1X}$, $S_{1Y}$, and $S_{1U}$ and to selectively actuate switches $S_{2a}$ and $S_3$. In detail, timing signal 25 is applied to a pair of input terminals $S_{2a}$ and $Z_2$ of a flip-flop circuit $Q_2$ which generates an output signal $Q_2$ and a complementary output signal $\overline{Q_2}$, output signal $\overline{Q_2}$ being applied to the plurality of coils of switches $S_{1X}$, $S_{1Y}$, and $S_{1U}$. The operation and structure of flip-flop $Q_2$ is similar to that of flip-flop $Q_1$ heretofore described in detail, flip-flop $Q_2$ being responsive to the concurrent application of a signal to both input terminals to reverse its state.

Timing signal 25 is further applied to an amplifier 94 and the amplified timing signal 25 is applied to a pair of "and" gates 96 and 98 to which there is also applied signals $Q_2$ and signals $\overline{Q_2}$, respectively. The output of "and" gate 96 is connected to a source of ground potential through a coil $S_{2a}$ while the output of gate 98 is connected to the source of ground potential through a coil $S_3$. "And" gates 96 and 98 are operable to pass timing signal 25 therethrough only when the output signal from flip-flop $Q_2$ applied thereto has the high level. Diode gates suitable for use as gates 96 and 98 are described in an article entitled "An Algebraic Theory for Use in Digital Computer Design" by C. E. Nelson, published in the Transactions of the Professional Group on Electronic Computers of the Institute of Radio Engineers, September 1954 issue.

Since flip-flop $Q_2$ is responsive to timing signal 25 applied to both its S and Z inputs for reversing its state, timing signal 25 will alternately be passed through gates 96 and 98 so that coil $S_{2a}$ will be inductively actuated alternately with coil $S_3$. It is clear that when coil $S_{2a}$ is actuated, switch $S_{2a}$ will be momentarily closed. In a like manner inductively actuated coil $S_3$ will cause switch $S_3$ to momentarily close.

In overall operation, summation circuit 30 is thus operable in response to timing signal 25 to integrate the values of one complete cycle of signal 26 and to concurrently apply the integrated value of the previous cycle to control signal generating systems 65. This is true since the timing signal 25 is equal in duration to the period of signal 26.

As hereinbefore mentioned, the operation of control generating system 65 is to generate three actuating signals which are applied to the three-single-degree-of-freedom gyros, respectively, within platform 10 for maintaining the platform horizontally stabilized and to rotate the platform to the predetermined azimuth orientation. The detail structure and operation of control signal generating system 65 as has been heretofore mentioned, is disclosed in Draper Patent 2,752,792.

Referring now to the overall operation of the embodiment of the invention disclosed herein, attention is directed to Fig. 2 wherein there is shown the waveforms of signals 16 and 18 when platform 10 is properly aligned to the predetermined azimuth orientation. Further, Fig. 2 shows the magnitude of the signals as a function of time, gyro 12 having the position with true north at time $t$ equal to zero, as shown in Fig. 1, time zero being taken to coincide with the time of generation of timing signal 25. If output signals 16 and 18 are added together as is done in synchronous rectifier circuit 22, the resultant waveform is as indicated by the broken line in Fig. 2, which is designated by the numerical character 100.

Figure 3:
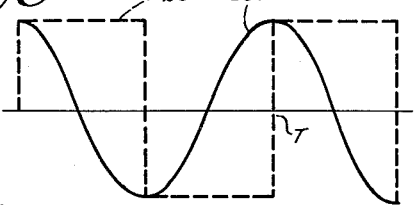

Referring now to Fig. 3, there is shown waveform 100 as well as the waveform of square wave 20. It should be noted that square wave signal 20 has the phase relationship shown in Fig. 3 since the precision switch is so adjusted that timing signal 25 is generated when pickoffs 60 and 54 are both 45 degrees removed from true north. With no delay set in variable delay 42, the predetermined azimuth position is that of true north so that lubber's point 44 is orientated to true north, as shown in Fig. 1.

Referring to Fig. 4, there is shown therein the waveform of signal 26, signal 26 being representative of the product of square wave signal 20 and waveform 100. It is apparent from viewing signal 26, as shown in Fig. 4, that if signal 26 is integrated from time 0 to time T the total integrated value will be zero since it is apparent that the integrated value of signal 26 from 0 to .5T is zero and from .5T to T is zero. Hence, torquing signal 33 will have zero magnitude which is precisely what is desired, since platform 10 is correctly aligned with true north, the predetermined azimuth position.

Figure 5:
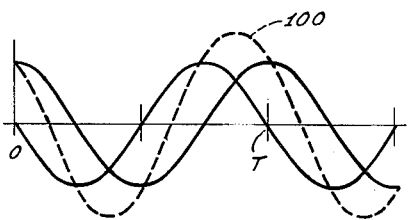
Figs. 5, 6 and 7 are graphs of signals generated by the embodiment of the invention when a stabilized platform is misaligned by 45 degrees.

Examining now the operation of the precision directional reference of the invention when platform 10 becomes misaligned from the predetermined azimuth orientation of true north assume, for example, that stabilized platform 10 is rotated in the counter-clockwise direction 45 degrees from the position shown in Fig. 1, so that lubber's mark 44 is displaced 45 degrees in the counter-clockwise direction from true north. There is shown in Fig. 5 the waveforms of output signals 16 and 18 produced when the platform is so misaligned and the waveform 100 of the sum of the two signals. It is apparent that output signals 16 and 18 in Fig. 5, are identical to the waveforms of the signals in Fig. 2 except that they have been shifted in phase 45 degrees. This is true since, as heretofore mentioned, time 0 is defined as the time of generation of the timing signal 25 and since lubber's mark 44 is now positioned 45 degrees in a clockwise direction from true north, timing signals 25 will be generated at a time ⅛T later than when lubber's mark 44 is directed at true north.

Figure 6:
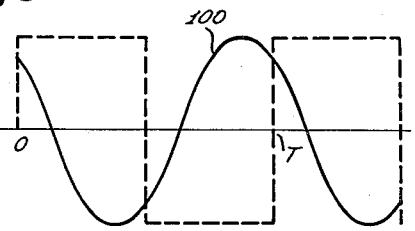

Referring now to Fig. 6, wherein there is shown waveform 100 of Fig. 5 and square wave signal 20, it is apparent that signal 26 will have the waveform shown in Fig. 7. As indicated in Fig. 7, the integrated value of one cycle of signal 26 from time 0 to time T will have a substantial negative value so that torquing signal 33 will also have a substantial negative value. It can be shown that control signal generating system 65 is responsive to a negative torquing signal 33 to generate the three actuating signals which are capable of actuating stabilized platform 10 to rotate in the clockwise direction thereby tending to bring lubber's mark 44 back to the predetermined position of true north.

Figure 8:
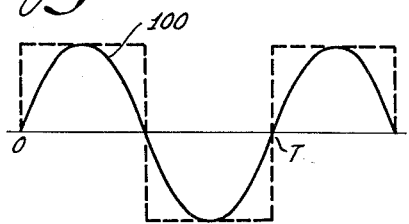
Figs. 8 and 9 are graphs of signals generated by the embodiment of the invention when a stabilized platform is misaligned by 90 degrees.
Figure 9:
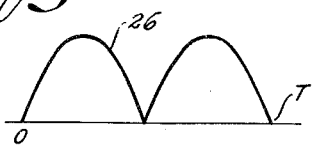

As another example of the ability of the precision directional reference to correctly orientate stabilized platform 10, assume that lubber's mark 44 of stabilized platform 10 is positioned 90 degrees from true north in the clockwise direction, as shown in Fig. 1. In the manner heretofore discussed, it can be shown that waveform 100 and square wave signal 20 will have the phase relationship shown in Fig. 8. Hence, signal 26 will have the waveform shown in Fig. 9. It is apparent from the waveform of signal 26 shown in Fig. 9 that the integrated value of signal 26 over one complete cycle from time 0 to time T will have a very substantial positive value so that torquing signal 33 will also have a very substantial positive value. As hereinbefore indicated, control signal generating system 65 is responsive to positive value torquing signal 33 to generate the three actuating signals having values which are capable of actuating stabilized platform 10 to rotate in the counter-clockwise direction thereby tending to bring lubber's mark 44 to a position whereby it will be aligned with the predetermined azimuth orientation of true north.

Figure 10:
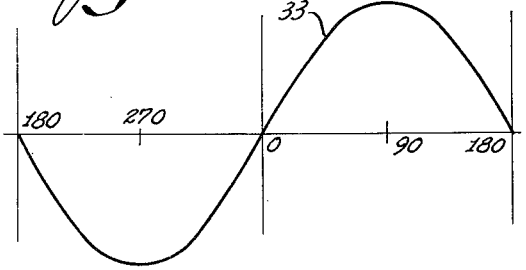
Fig. 10 is a graph of a torquing signal generated by the embodiment of the invention with respect to the angular misalignment of a stabilized platform.

In a similar fashion it can be shown that torquing signal 33 will have the general waveform shown in Fig. 10. Referring to Fig. 10, there is shown the magnitude of torquing signal 33 with respect to the angle of deviation of lubber's mark 44 from the predetermined azimuth orientation, the angular measurement running in the clockwise direction. As shown in Fig. 10, a positive torquing signal 33 is generated whenever lubber's mark 44 is displaced from 0 to 179 degrees from the predetermined azimuth orientation while a negative torquing signal 33 is generated whenever lubber's mark 44 is displaced from 180 to 359 degrees from the predetermined azimuth orientation. As hereinbefore indicated, positive torquing signals cause platform 10 to rotate in a counter-clockwise direction while a negative torquing signal will cause platform 10 to rotate in a negative direction so that the polarity of torquing signal 33 is such that lubber's mark 44 will be directed to the predetermined azimuth orientation over the shortest route. It should be noted that at the position 180 degrees from the predetermined azimuth orientation an unstable equilibrium condition exists. However, the noise level of the actuating signals generated by control signal generating system 65 is always sufficient enough to move the platform out of the unstable equilibrium position whereby it will be rotated to the predetermined azimuth orientation.

It is clear that, in accordance with one of the basic concepts of the invention, the azimuth orientation of the stabilized platform is determined not by the magnitude of output signals 16 and 18 but by the phase relationship of output signals 16 and 18 with respect to square wave signal 20. It is apparent then that constant magnitude errors will have no effect upon the accuracy of the precisional directional reference system of the invention. Furthermore, it can be shown that errors which are not fourth harmonics or multiples thereof of the frequency of rotation of gyro 12 will have no effect upon the accuracy of the precisional reference system of the invention. With the foregoing facts in mind it is clear that the period of rotation of gyro 12 should be so chosen that substantially all platform errors will be substantially constant in nature over one period. In this regard, it has been found that the period of rotation is not critical. Periods ranging from five seconds to five minutes are convenient for use.

It should be apparent from the foregoing remarks that numerous modifications and alterations can be made in the embodiment of the precision directional reference system heretofore disclosed without departing from the basic concepts of the invention. For example, stabilized platform 10 need not remain stationary with respect to the earth but can move over the earth's surface in any desired manner as long as apparatus is provided to compensate for the relative movement of the platform with respect to the earth. Furthermore, it should be noted that the precisional direction reference of the invention is not limited to use with a gyroscopic stabilized platform but can be utilized to advantage in conjunction with any surface whatsoever which can be maintained in a horizontal position. The gyroscope used in the directional reference system need not be a two degree of freedom gyroscope, as shown in Fig. 1, but a single-degree-of-freedom gyroscope can be utilized therein with equal success.

What is claimed as new is:

1. In a precision directional reference system azimuthally aligning a horizontally stabilized platform to a predetermined azimuth rotation, the combination comprising: a gyro having a spin axis, said gyro including a case, a rotor, means for spinning said rotor about said spin axis and pick-off means for generating an output signal representative of the rotation of said case with respect to said rotor about a predetermined axis; coupling means for rotatably coupling said gyro to a stabilized platform; rotation means for rotating said gyro case with respect to said platform to generate from said pick-off means said output signal having a wave form with a predetermined period; synchronous rectification means for operating on said output signal to generate a partially inverted signal having substantially the predetermined period, said partially inverted signal being representative of said output signal with reversed polarity for half of each period; summation means responsive to said partially inverted signal for generating a torquing signal whose magnitude is proportional to the integrated value of said partially inverted signal over an interval substantially equal to the predetermined period; and means for applying said torquing signal to the stabilized platform to rotate the platform in azimuth.

2. In a precision directional reference system azimuthally aligning a horizontally stabilized platform to a predetermined azimuth rotation, the combination comprising: a gyro having a spin axis, said gyro including a case, a rotor, means for spinning said rotor about said spin axis and pick-off means for generating an output signal representative of the rotation of said case with respect to said rotor about a predetermined axis; coupling means for rotatably coupling said gyro to a stabilized platform; rotation means for rotating said gyro case with respect to said platform to generate from said pick-off means said output signal having a periodic waveform; first means responsive to said output signal for generating a torquing signal; and second means for applying said torquing signal to the stabilized platform to rotate the platform in azimuth.

3. The combination defined in claim 2 wherein said first means includes synchronous rectification means for operating on said output signal to generate a partially inverted signal having a periodic waveform said partially inverted signal being representative of said output signal for a portion of each period and representative of said output signal with reversed polarity for the remaining portion of each period.

4. The combination defined in claim 2 wherein said first means includes summation means responsive to said output signal for generating said torquing signal having a magnitude which is proportional to the integrated value of said output signal over one cycle of said output signal having said periodic waveform.

5. In a precision directional reference system for aligning an azimuth indicator on an inertial platform with respect to a predetermined azimuth position by means of measuring the rate of rotation of the platform due to the rotation of the earth, the combination comprising: a gyro having a spin axis and a gimbal axis, said gyro including a case, a rotor, means for spinning said rotor about said spin axis and pick-off means for generating an output signal representative of the displacement of said case with respect to said rotor about said gimbal axis; means responsive to said output signal for torquing said rotor to minimize the displacement of said rotor; an inertial platform stabilized in a substantially horizontal plane, said platform being responsive to the application of a plurality of predetermined actuating signals for rotating in the horizontal plane; coupling means for rotatably coupling said case to said inertial platform, said case being rotatable with respect to said platform about said spin axis; a precision switch for generating a timing signal when said case has a predetermined angular position with respect to the azimuth indicator point; first means for rotating said case about said spin axis whereby said output signal is a substantially alternating current signal whose phasing is dependent upon the orientation of said platform with regard to true north, said first means further including apparatus for generating in synchronism with said case rotation a square wave signal; third means actuable in response to said timing signal for producing a torquing signal whose magnitude is representative of the difference in phasing of said output signal and said square wave signal; coupling means for applying said square wave signal and said output signal to said third means; and a control signal generator coupled to said platform and responsive to said torquing signal for generating said predetermined actuating signals.

6. The combination defined in claim 5 wherein said precision switch includes a delay circuit for delaying the application of said timing signal whereby said platform is aligned at a predetermined angle from the predetermined azimuth position.

7. In a precision directional reference system for aligning an azimuth indicator on an inertial platform with respect to a predetermined azimuth position, the combination comprising: a two-degree-of-freedom gyro having a spin axis, said gyro including a case, a rotor, means for spinning said rotor about said spin axis, and pick-off means for generating an output signal representative of the displacement of said case with respect to said rotor; means responsive to said output signal for torquing said rotor to minimize the displacement of said rotor with respect to said case; an inertial platform stabilized in a substantially horizontal plane, said platform being responsive to the application of a plurality of predetermined actuating signals for rotating in the horizontal plane; coupling means for rotatably coupling said case to said inertial platform; rotating means for rotating said gyro case with respect to said platform about said spin axis to generate from said pick-off means said output signal having a periodic form and a phase which is dependent upon the orientation of the azimuth indicator with true north, said rotating means further including apparatus for generating in synchronism with said gyro case rotation a square wave signal; third means actuable in response to said square wave signal and said output signal for producing a torquing signal whose magnitude is representative of the difference in phasing of said output signal and said square wave signal; coupling means for applying said square wave signal and said output signal to said third means; and a control signal generator coupled to said platform and responsive to said torquing signal for generating said predetermined actuating signals.

8. The combination comprising: a gyro including a case, a rotor, means for spinning said rotor about said spin axis and pick-off means for generating an output signal representative of the rotation of said case with respect to said rotor; a platform rotatable about a first axis in inertial space; coupling means for rotatably coupling said gyro case to said platform, said gyro case being rotatable with respect to said platform about a second axis perpendicular to said first axis; and rotating means for rotating said gyro case about said second axis whereby said output signal accurately represents the rate of rotation of said platform about said first axis.

9. The combination defined in claim 8 wherein said gyro is a two-degree-of freedom gyro whose rotor is rotatable about third and fourth predetermined axes with respect to said gyro case and said pick-off means includes apparatus for generating first and second signals representative of the rotation of said gyro case with respect to said rotor about said third and fourth predetermined axes, respectively, and wherein said combination further includes means for operating on said first and second signals to generate said output signal representative of the sum of the values of said first and second signals.

10. In a precision directional reference system for aligning an inertial platform, the combination comprising: a two-degree-of-freedom gyro having a spin axis, said gyro including a case, a rotor, and means for spinning said rotor about said spin axis; an inertial platform stabilized in a substantially horizontal plane, said platform being responsive to a plurality of predetermined actuating signals for rotating within the horizontal plane; coupling means for rotatably coupling said case to said inertial platform; first means for rotating said case about said spin axis with a predetermined frequency, said first means further including apparatus for generating in synchronism with said rotation a square wave signal having the predetermined frequency; pick-off means for generating a sinusoidal output signal, said output signal having a phase shift with respect to said square wave signal whose magnitude is proportional to the magnitude of misalignment of said platform with true north; second means responsive to said output signal and said square wave signal for generating a torquing signal whose magnitude is representative of the phase shift of said output signal with respect to said square wave signal; and a control signal generator coupled to said platform and responsive to said torquing signal for generating said predetermined actuating signals.

11. In a precision directional reference system for aligning an azimuth indicator point on an inertial platform to a predetermined azimuth orientation, the combination comprising: a two-degree-of-freedom gyro having a spin axis, said gyro including a case, a rotor, means for spinning said rotor about said spin axis, and pick-off means for generating an output signal representative of the displacement of said rotor with respect to said case; means responsive to said output signal for torquing said rotor to minimize the displacement of said rotor; an inertial platform stabilized in a substantially horizontal plane, said platform being responsive to a plurality of predetermined actuating signals for rotating in said horizontal plane; coupling means for rotatably coupling said case to said inertial platform with said spin axis being in a substantially vertical position, said case being rotatable about said spin axis; means for rotating said case about said spin axis with respect to said platform with a frequency which has a predetermined period; a precision switch for generating a timing signal when said case has a predetermined angular position with respect to the azimuth indicator point; summation means coupled to said rotating gyro and operable in response to said timing signal for generating a summation signal whose value is representative of the integrated value of a predetermined applied signal over a predetermined interval commencing with the application of said timing signal and continuing for the predetermined period; synchronous rectification means responsive to said output signal and said timing signal for generating the predetermined applied signal, the value of the predetermined applied signal being representative of said output signal having a reversed polarity during a portion of the predetermined interval; a control signal generator coupled to said platform and responsive to said summation signal for generating said predetermined actuating signals whereby the azimuth indicator point is directed to the predetermined azimuth.

12. In a precision directional reference system for aligning an azimuth indicator point on an inertial platform to a predetermined azimuth orientation by means of measuring the rate of rotation of the platform due to earth rate, the combination comprising: a two-degree-of-freedom gyro having a spin axis and first and second gimbal axes mutually orthogonal with each other and said spin axis, said gyro including a case, a rotor, means for spinning said rotor about said spin axis, and pick-off means for generating an output signal representative of the displacement of said rotor with respect to said case; first means responsive to said output signal for torquing said rotor to minimize the displacement of said rotor; an inertial platform stabilized in a substantially horizontal plane, said platform being responsive to a plurality of actuating signals for rotating in said horizontal plane; coupling means for rotatably coupling said case to said inertial platform with said spin axis being in a substantially vertical position, said case being rotatable about said spin axis with respect to said platform; a precision switch for generating a timing signal when said case has a predetermined angular position with respect to the azimuth indicator point; second means for rotating said case about said spin axis with a frequency that has a predetermined period and said second means further including apparatus actuable in response to said timing signal for generating in synchronism with the rotation of said case a square wave signal having a frequency whose period is substantially equal to the predetermined period; third means responsive to said square wave signal and said output signal for operating thereon for producing a rectified signal which is representative of the product of said output signal and said square wave signal; integrating means coupled to said case and actuable upon application of said timing signal thereto for generating a summation signal whose value is representative of the integrated value of said rectifying signal over an interval equal to the predetermined period and commencing upon application of said timing signal whereby the value of said summation signal is indicative of the degree of misalignment of the azimuth indicator; a control signal generator coupled to said platform and responsive to said summation signal for generating said predetermined actuating signals.

13. The combination defined in claim 12 wherein said pick-off means includes apparatus for generating first and second signals representative of the displacement of said rotor with respect to said case about said first and second gimbal axes, respectively, and apparatus for operating on said first and second signals to generate said output signal representing the sum of said first and second signals.

References Cited in the file of this patent
UNITED STATES PATENTS

| | | |
|---|---|---|
| 2,633,029 | Lajeunesse | Mar. 31, 1953 |
| 2,752,792 | Draper et al. | July 3, 1956 |
| 2,771,779 | Schaffer et al. | Nov. 27, 1956 |
| 2,809,528 | Serson et al. | Oct. 15, 1957 |